United States Patent
Courtat (10) Patent No.: US 11,516,055 B2
(45) Date of Patent: *Nov. 29, 2022

(54) ERROR RETRO-PROPAGATION FOR A CHAIN FOR THE BLIND DEMODULATION OF A DIGITAL TELECOMMUNICATION SIGNAL

(71) Applicant: Avantix, Aix-en-provence (FR)

(72) Inventor: Thomas Courtat, Paris (FR)

(73) Assignee: AVANTIX, Aix-en-Provence (FR)

( * ) Notice: Subject to any disclaimer, the term of this patent is extended or adjusted under 35 U.S.C. 154(b) by 186 days.

This patent is subject to a terminal disclaimer.

(21) Appl. No.: 16/957,562

(22) PCT Filed: Dec. 21, 2018

(86) PCT No.: PCT/EP2018/086830
§ 371 (c)(1),
(2) Date: Sep. 9, 2020

(87) PCT Pub. No.: WO2019/129759
PCT Pub. Date: Jul. 4, 2019

(65) Prior Publication Data
US 2020/0328921 A1    Oct. 15, 2020

(30) Foreign Application Priority Data

Dec. 29, 2017    (FR) ...................................... 1701418

(51) Int. Cl.
*H04L 27/233*    (2006.01)
*G06N 3/04*    (2006.01)
(Continued)

(52) U.S. Cl.
CPC ....... *H04L 27/2331* (2013.01); *G06N 3/0454* (2013.01); *G06N 3/063* (2013.01);
(Continued)

(58) Field of Classification Search
CPC ...... G06N 3/084; G06N 3/063; G06N 3/0454; H04L 25/0331; H04L 25/2331; H04L 25/0012; H04L 25/0014; H04L 25/3845
See application file for complete search history.

(56) References Cited

U.S. PATENT DOCUMENTS

| 5,517,598 A | 5/1996 | Sirat |
| 2013/0216005 A1 | 8/2013 | Chaudhary et al. |

(Continued)

FOREIGN PATENT DOCUMENTS

| EP | 0 372 613 A1 | 6/1990 |
| FR | 3 030 964 A1 | 6/2016 |

OTHER PUBLICATIONS

Treichler, J.R. et al., "Practical implementations of blind demodulators," Signals, Systems and Computers 1997, Conference Record of the Thirty-First Asilomar Conference, dated Nov. 2-5, 1997, Publisher: IEEE, DOI: 10.1109/ACSSC.1997.679062, pp. 1028-1032.

(Continued)

*Primary Examiner* — Elton Williams
(74) *Attorney, Agent, or Firm* — Arc IP Law, PC; Joseph J. Mayo (57) ABSTRACT

The present invention concerns a real-time method for the blind demodulation of digital telecommunication signals, based on the observation of a sampled version of this signal. The method comprises the following steps: —acquisition, by a sampling, of a first plurality of signals in order to each constitute an input of a network of L processing blocks (G, F, H), also referred to here as "specialized neurons", each neuron being simulated by the outputs of the preceding block, the first plurality of signals being input into the first block simulating a first neuron of the network in order to generate a plurality of outputs of the first block; each neuron F being simulated by the outputs of an upstream chain G and (Continued)

stimulating a downstream chain H; each set of samples passes through the same processing chain; —the outputs of the last blocks of the network ideally correspond to the demodulated symbols; —addition of a nonlinearity to each of the outputs of the last block of the network making it possible to calculate an error signal and propagation of this error in the reverse direction of the processing chain ("retro-propagation"); —estimation, upon receipt of the error by each neuron (i), of a corrective term $\delta\theta_i$ and updating, in each block, of the value of the parameter $\theta_i$ according to $\theta_i \mathrel{+}= \delta\theta_i$.

14 Claims, 3 Drawing Sheets

(51) Int. Cl.
*G06N 3/063* (2006.01)
*G06N 3/08* (2006.01)
*H04L 25/03* (2006.01)
*H04L 27/00* (2006.01)
*H04L 27/38* (2006.01)

(52) U.S. Cl.
CPC ....... *G06N 3/084* (2013.01); *H04L 25/03331* (2013.01); *H04L 27/0012* (2013.01); *H04L 27/0014* (2013.01); *H04L 27/3845* (2013.01)

(56) References Cited

U.S. PATENT DOCUMENTS

2020/0328922 A1* 10/2020 Courtat ............... H04L 27/0014
2020/0358644 A1* 11/2020 Courtat ............... H04L 25/0305

OTHER PUBLICATIONS

Treichler, J.R. et al., "Practical Blind Demodulators for High-Order QAM Signals," Proceedings of the IEEE, vol. 86, No. 10, published on Oct. 1, 1998, pp. 1907-1926.
Barembruch, S., "Approximate Maximum Likelihood Methods for Large Scale Blind Classification and Identification in Digital Communications," dissertation, Telecom ParisTech, submitted on Mar. 7, 2011, pp. 1-175.
Punskaya, E., "Sequential Monte Carlo methods for digital communications," dissertation submitted to the University of Cambridge, dated Jul. 2003, pp. 1-175.
International Search Report of the International Searching Authority for PCT/EP2018/086830 dated Mar. 29, 2019.
English translation of International Search Report of the International Searching Authority for PCT/EP2018/086830 dated Mar. 29, 2019.

* cited by examiner

ERROR RETRO-PROPAGATION FOR A CHAIN FOR THE BLIND DEMODULATION OF A DIGITAL TELECOMMUNICATION SIGNAL

TECHNICAL FIELD OF THE INVENTION

The present invention relates generally to methods and systems for signal processing in digital telecommunications, and more particularly to the blind demodulation of single-polarization and dual-polarization signals.

TECHNOLOGICAL BACKGROUND OF THE INVENTION

In digital telecommunications, a transmitter seeks to transmit a sequence of information bits to one (or more) receiver(s). The transmitter performs a series of coding operations in order to make possible the transmission of the information on a physical medium which is also called a propagation channel (such as an optical fiber, or as is more particularly the case here, by unconstrained propagation in space). This propagation channel is generally not perfect in the sense that the received signal is not an exact replica of the transmitted signal (thermal disturbances, reverberations, dispersion, imperfections in the radiofrequency chain). At the transmitter, a constellation is provided (for example, ASK (amplitude-shift keying), PSK (phase-shift keying) or else M-QAM (quadrature amplitude modulation in M states)), which is a finite set of symbols in the complex plane and a function with a specific number of consecutive bits associating a symbol of the constellation. Each symbol in the sequence is multiplied by a continuous waveform (or shaping filter), time-shifted to form the baseband signal. This baseband signal is transposed at a certain frequency, called the carrier frequency, and then transmitted by a radio interface (an antenna in the case of a wireless transmission). On reception, the reverse operations are performed to reconstruct the information bits from the signal measured on the radio interface. In particular, demodulation is the operation that identifies on reception the symbols actually transmitted by the transmitter from the received signal.

In cooperative telecommunications, most parameters are defined by contract between the transmitter and the receiver (carrier frequency, constellation type, time lag between waveforms, transmit power). The only remaining unknowns are possible synchronization errors and the effect of the propagation channel. These parameters are generally estimated by regular transmission of sequences, referred to as pilots, known to both parties. The operation compensating the effects of the channel before demodulation is called equalization.

In non-cooperative or "blind" telecommunications, on the other hand, all or some of the parameters are unknown, or only known as an order of magnitude, and there are no pilot sequences to facilitate equalization.

The documents (S. Barembruch, "*Méthodes approchées de maximum de vraisemblances pour la classification et identification aveugles en communications numériques*" ["Approximate maximum likelihood methods for blind classification and identification in digital communications"], dissertation, Telecom ParisTech, 7 Mar. 2011) and (E. Punskaya, "*Sequential Monte Carlo methods for digital communications*", dissertation, Cambridge University, 2003) present two similar methods based on the EM ("Expectation Maximization") algorithm enabling blind demodulation of telecommunication signals. However, these approaches, albeit of reduced complexity, do not make it possible to process high-rate signals in real time; they are focused on the compensation of the propagation channel and do not make it possible to compensate other signal distortions (synchronization, phase, carrier drift, etc.). They do not make it possible to monitor temporal variations in the parameters. They also do not make it possible to process signals over several polarizations.

One of the aims of patent FR3030964 is to propose methods enabling the blind separation and demodulation of two linearly modulated, single-channel, frequency-superimposed telecommunication signals using an expectation maximization algorithm and particle filtering techniques. While this method makes it possible to monitor the temporal variations of the parameters, it is still too demanding in terms of computing time to be able to monitor a high-rate signal in real time and for large orders of modulation.

GENERAL DESCRIPTION OF THE INVENTION

The aim of the present invention is to overcome some of the disadvantages of the prior art by proposing a solution making it possible to optimize and facilitate the blind demodulation of digital telecommunication signals in order to define as precisely as possible the characteristics of the signals, while enabling real-time implementation.

To this end, the present invention concerns a real-time method for the blind demodulation of digital telecommunication signals, based on the observation of a sampled version of this signal.

The method comprises the following steps:

acquisition, by a sampling, of a first plurality of signals in order to each constitute an input of a network of L processing blocks, also referred to here as "specialized neurons", each neuron being simulated by the outputs of the preceding block, the first plurality of signals being input into the first block simulating a first neuron of the network in order to generate a plurality of outputs of the first block; each neuron $F_i$ being simulated by the outputs of an upstream chain $G_i$ and stimulating a downstream chain $H_i$; each set of samples passes through the same processing chain;

the outputs of the last blocks of the network ideally correspond to the demodulated symbols;

addition of a nonlinearity to each of the outputs of the last block of the network making it possible to calculate an error signal and propagation of this error in the reverse direction of the processing chain ("retropropagation");

estimation, upon receipt of the error by each neuron (i), of a corrective term $\delta\theta_i$ and updating, in each block, of the value of the parameter $\theta_i$ according to $\theta_i += \delta\theta_i$.

And that each neuron of the network specifically carries out:

a processing of a "Next" function, implemented and executed in a processing logic sub-block ($F_i^{(N)}$), in order to generate outputs based on a plurality of observations of the signal and to transmit them to the processing block of the following neuron in the network; this function is generally written in the form $(X_{i+1,0}, \ldots, X_{i+1,m_{i+1}-1})=\text{next}(X_{i,0}, \ldots, X_{i,m_i-1})$ with m; the number of inputs and $m_{i+1}$ the number of outputs of $F_i^{(N)}$ which corresponds to the number of inputs of $F_{i+1}^{(N)}$.

a processing of a "Propagate" function, implemented and executed in a "Propagate" logic sub-block ($F_i^{(P)}$) in order to calculate the errors $(e_{i+1,0}, \ldots, e_{i+1,m_{i+1}-1})$ provided by the block or by $F_{i+1}^{(P)}$ or by $(e_{L-1,0}, \ldots, e_{L-1,N-1})=(e_0, \ldots, e_{N-1})$ with $e_j=z_j-y_j$ at the chain end, i.e. at the input $F_{L-1}^{(P)}$; for the $i^{th}$ neuron, this function is generally written in the form $(e_{i,0}, \ldots, e_{i,m_i-1})$=propagate $(e_{i+1,0}, \ldots, e_{i+1,m_{i+1}-1})$;

a processing of an "Update" function, implemented and executed in an "Update" logic sub-block ($F_i^{(U)}$), in order to calculate the corrective parameters $\delta\theta_i$ to be applied to the current value of the internally stored parameter $\theta_i$ from the errors $(e_{i+1,0}, \ldots, e_{i+1,m_{i+1}-1})$ returned by the sub-block $F_{i+1}^{(P)}$; this function is generally written in the form $\delta\theta_i$=update $(e_{i+1,0}, \ldots, e_{i+1,m_{i+1}-1})$.

According to another particular feature, each neuron comprises at least one implementation and execution of a sequence of elementary processes of the form:

the sub-block $F_i^{(N)}$ performs $(X_{i+1,0}, \ldots, X_{i+1,m_{i+1}-1})$ next $(X_{i,0}, \ldots, X_{i,m_i-1})$, $X_{ij} \in K^{q_{ij}}$ with $q_{ij}$ an integer and K the real number space or the complex number space the sub-block $F_i^{(P)}$ performs $(e_{i,0}, \ldots, e_{i,m_i-1})$=propagate $(e_{i+1,0}, \ldots, e_{i+1,m_{i+1}-1})$ the sub-block $F_i^{(U)}$ performs $\delta\theta_i$=update $(e_{i+1,0}, \ldots, e_{i+1,m_{i+1}-1})$ According to another particular feature, the addition of the nonlinearity at the output of the last block ($H_i^{(N)}$) of the network is executed by the function:

$$z_j = NL(y_j) \text{ wherein}$$

$z_j$ is the outgoing signal from a decision-making device in the last block $y_j$ is an equalized or demodulated sample the decision-making block being defined by the comparison of the result obtained by the output y of the phase block with a finite constellation of possible results stored by the decision-making block, and deciding to take, from the possible results, the one for which the distance with the representative point of the output y is the smallest.

According to another particular feature, the retropropagation of the calculated errors is obtained by the following processes, implemented and executed by an algorithm for retropropagation of the error:

initialization of the retropropagation in the form for $0 \leq k < N$, $e_{L,k} = \overline{z_k - y_k}$ propagation of the error by the sub-neuron $F_i^{(P)}$ in the function $(e_{i,0}, \ldots, e_{i,m_i-1})$=propagate $(e_{i+1,0}, \ldots, e_{i+1,m_{i+1}-1})$ according to the calculations $$\circ \forall\, 0 \leq j < m_i,\ e_{i,j} = \sum_k e_{i+1,k} \cdot \frac{\partial F_{i,k}}{\partial x_{i,j}}$$

According to another particular feature, the updating of the internal parameters $\theta_i$ of each neuron $F_i$ is obtained in the sub-neuron $F_i^{(U)}$ by the processes, implemented and executed in the function $\delta\theta_i$=update $(e_{i+1,0}, \ldots, e_{i+1,m_{i+1}-1})$ according to:

Calculation of $\Delta_i$:

$$\text{For } 0 \leq j < M_{i+1},\ D_{i,j} = e_{i+1,j} \cdot \frac{\partial F_{i,j}^{(N)}}{\partial \theta_i}$$

$$\Delta_i = \sum_j D_{i,j}$$

Updating of $\theta_i$:

$\theta_i$ += $2\mu \Re(\Delta_i)$ if $\theta_i$ is in an R vector space
$\theta_i$ += $2\mu \Delta_i$ if $\theta_i$ is in a C vector space With $\mu_i$ a real parameter called "learning rate"

$\delta\theta_i$ is the corrective parameter of the parameter $\theta_i$ $D_{ij}$ is an intermediate quantity of auxiliary calculations that can be temporarily stored.

According to another particular feature, as the samples input into the system are processed by the different sub-blocks, the arbitrarily initialized values of the different parameters $\theta_i$ converge on values making the demodulation effective.

According to another particular feature, the specialized neuron network constitutes a sequence of blocks of MIMO ("multi inputs, multi outputs") type.

According to another particular feature, the method further comprises the storage, by at least one buffer memory, of the plurality of inputs and, in at least one other buffer, of the plurality of outputs of each specialized neuron of the network.

According to another particular feature, the acquisition by a sampling is performed on two input signals.

According to another particular feature, the method is applied in a certain single-channel scheme on another device making it possible to demodulate a single-channel signal of linear modulation by compensating: the amplification of the signal, its phase, its carrier leak, the effects of the propagation channel.

According to another particular feature, on initialization of the computing system constituting a demodulator, the parameters $\theta_i$ are provided by default by a memory of the system in the first moments of execution of the method, the system enabling the convergence of the parameters $\theta_i$ on relevant values.

According to another particular feature, when the distances between the calculated values and those stored p and defining a vicinity are below a certain threshold pre-stored by the device, the outputs of the device are then delivered to a user apparatus.

Another aim is to overcome one or more of the disadvantages of the prior art relating to implementing or executing a method for the blind demodulation of digital telecommunication signals in computing hardware. The method enables the separation of the components of a dual-channel signal received after mixing.

This aim is achieved by a computer program product implemented on a memory medium, capable of being executed within a computing processing unit, either by hardware or a combination of hardware and firmware, and comprising instructions for executing a method according to any one of the preceding claims.

Another aim is to overcome one or more of the disadvantages of the prior art relating to the application of a method for the blind separation and demodulation of digital telecommunication signals with linear modulation in a computing network.

This aim is achieved by a use in a system for the blind demodulation of a telecommunication signal, the system comprising at least one network of specialized neurons each respectively defining a filtering by a first specialized neuron, an amplification gain by a second specialized neuron, the frequency of the signal by a third specialized neuron and the phase value of the signal by a fourth specialized neuron; characterized in that the method according to any one of the preceding claims is executed in order to determine the characteristics of the blind-transmitted signal.

Other particular features and advantages of the present invention are detailed in the following description.

DESCRIPTION OF THE ILLUSTRATIVE FIGURES

Other special features and advantages of the present invention will become clear from reading the following description, made in reference to the appended drawings, wherein.

The same references may designate identical or similar elements in the different figures.

DESCRIPTION OF PREFERRED EMBODIMENTS OF THE INVENTION

It will be noted hereinafter that each specialized neuron of the network corresponds to a processing logic block and comprises at least one functional sub-block or sub-module (or calculation operator). Each of the blocks of the neurons comprises at least one computing machine and a software or code that can be executed by the machine in order to define one or more parameter(s) obtained by calculating one or more analytic function(s) (whether real or complex, and of one or more specific dimension(s)).

The present invention relates to a real-time method for the blind demodulation of digital telecommunication signals, based on the observation by sampling of a signal; this signal corresponds to the reception of a linear-modulation signal that has undergone deformations during transmission thereof, the processing process comprising the following steps:

acquisition by sampling of $m_0$ signals ($x_{0,0}, \ldots, x_{0,m_0-1}$) in order to each constitute an input of a network of specialized neurons, each neuron $F_i$ being simulated by the outputs of an upstream chain $G_i$ and stimulating a downstream chain $H_i$; each set of samples passes through the same processing chain;

for each new sample input, each sub-neuron $F_i^{(N)}$ is stimulated by the outputs of the upstream chain $G_i^{(N)}$ formed by the cascading of the specialized neurons $F_0^{(N)}$ to $F_{i-1}^{(N)}$ and stimulating the downstream chain $H_i^{(N)}$ formed of the specialized neurons $F_{i+1}^{(N)}$ to $F_{L-1}^{(N)}$; the processes carried out by the sub-module $F_i^{(N)}$ depend on an internally-stored parameter $\theta_i$; the outputs of the last neuron $F_{L-1}^{(N)}$ constitute the outputs of interest of the system or else the demodulated signals, and are noted $y_0 \ldots y_N$;

a nonlinear function (NL) is applied independently to each demodulated signal y in order to produce the variables ($z_j$) and to calculate the chain-end errors $e_j = \overline{z_j} - y_j$, retropropagation of the error and updating of the parameter $\theta_i$;

an error signal passes through the network in the reverse direction: from the neuron $F_{L-1}$ to the neuron $F_0$; the error at the input of the neuron $F_{L-1}$ is the vector ($e_{L-1,0}, \ldots, e_{L-1,N-1}$) ($e_0, \ldots, e_{N-1}$); when passing through the neuron j, the error is modified by the sub-neuron $F_j^{(P)}$ (before being transmitted to the neuron $F_{j-1}$; in parallel to the retropropagation of the error from the neuron j to the neuron j−1, the error originating from the neuron j+1 is input into the sub-neuron $F_j^{(U)}$ which produces a corrective term $\delta\theta_i$ which enables the updating of the internal parameter $\theta_i$ according to $\theta_i += \delta\theta_i$.

This calculated error can make it possible to correct the current value of $\theta_i$ for each block. The outputs of the last blocks of the network ideally correspond to the demodulated symbols.

These telecommunication signals can include deformations comprising, in particular: a channel filter (and a co-channel filter in the dual-channel case), an amplification, a phase value, a carrier leak, noise and other stochastic disturbances such as phase noise. Thus, according to the invention, the demodulation network will correct these different effects through specialized processing neurons. Specialized processing neurons are intended to mean one or more functions of which the parameters can be updated by retropropagation.

In some embodiments, the parameters $\theta_i$ of the different processing blocks are initially predefined, for example arbitrarily without moving away from the expected values. For each sample entering the system and for each neuron i, our system produces a corrective term $\delta\theta_i$ which is added to the current value of the parameter $\theta_i$: $\theta_i += \delta\theta_i$. This update equation produces a sequence of values of $\theta_i$ which converge on the value $\theta_i$ which makes it possible to best demodulate the input signal.

In some embodiments, each neuron $F_i$ of the network specifically carries out:

a processing of a "Next" function, implemented and executed in a processing logic sub-block $F_i^{(N)}$ in order to generate outputs based on a plurality of observations of the signal and to transmit them to the processing block of the following neuron in the network; for the neuron $F_i$, this function is generally written with its inputs/outputs in the form ($X_{i+1,0}, \ldots, X_{i+1,m_{i+1}-1}$)=next ($X_{i,0}, \ldots, X_{i,m_i-1}$) with m; the number of inputs and $m_{i+1}$ the number of outputs of $F_i^{(N)}$ which corresponds to the number of inputs of $F_{i+1}^{(N)}$. Each processing is parameterized by a set of parameters $\theta_i$, hence the notation $F_i^{(N)} = F_i^{(N)}(\bullet | \theta_i)$ when it is sought to recall the importance of the parameterization.

a processing of a "Propagate" function, implemented and executed in the logic sub-block $F_i^{(P)}$ (in order to calculate the errors ($e_{i,0}, \ldots, e_{i,m_i-1}$) from the errors ($e_{i+1,0}, \ldots, e_{i+1,m_{i+1}-1}$) provided by the block $F_{i+1}^{(P)}$ or by ($e_{L-1,0}, \ldots, e_{L-1,N-1}$)=($e_0, \ldots, e_{N-1}$) with $e_j = \overline{z_j} - y_j$ at the chain end, i.e. at the input $F_{L-1}^{(P)}$. This function is written, for the $i^{th}$ neuron: ($e_{i,0}, \ldots, e_{i,m_i-1}$)=propagate ($e_{i+1,0}, \ldots, e_{i+1,m_{i+1}-1}$)

a processing of an "Update" function, implemented and executed in an "Update" logic sub-block $F_i^{(U)}$ in order to calculate the corrective term $\delta\theta_i$ to be applied to the current value of the internally stored parameter $\theta_i$ from the errors ($e_{i+1,0}, \ldots, e_{i+1,m_{i+1}-1}$) returned by the sub-block $F_{i+1}^{(P)}$. This function is generally written in the form $\delta\theta_i$=update ($e_{i+1,0}, \ldots, e_{i+1,m_{i+1}-1}$).

"Implemented and executed" is intended to mean either the execution of a program corresponding to the mathematical functions or formulae (explained in the text) by computing hardware (such as a microprocessor and a memory), or by hardware or a combination of hardware and firmware.

Figure 2:
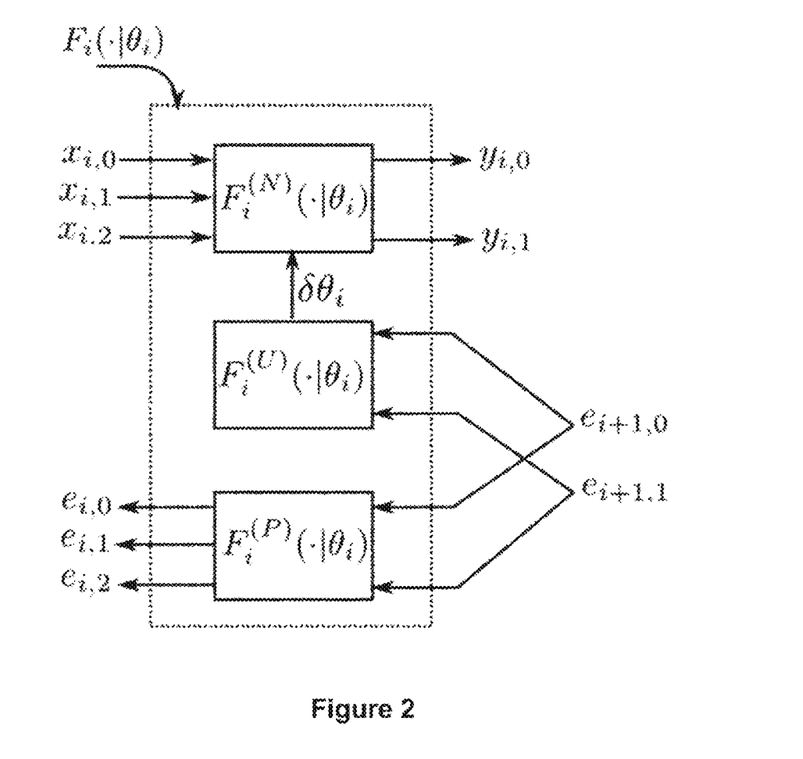
FIG. 2 schematically depicts the processes carried out by the specialized neuron named ($F_i$) of the network, according to one embodiment of the invention.

Thus, as depicted in FIG. 2, each neuron $F_i$ encapsulates at least two logic sub-neurons which each implement at least one of the two functions "update" and "next" hereinafter and the function "propagate" which is not necessarily implemented by the first block ($G_i$):

$F_i^{(N)}$ implements $(X_{i+1,0}, \ldots, X_{i+1,m_{i+1}-1})$ next $(X_{i,0}, \ldots, X_{i,m_i-1})$ $F_i^{(P)}$ implements $(e_{i,0}, \ldots, e_{i,m_i-1})$=propagate $(e_{i+1,0}, \ldots, e_{i+1,m_{i+1}-1})$ $F_i^{(U)}$ implements $\delta\theta_i$=update $(e_{i+1,0}, \ldots, e_{i+1,m_{i+1}-1})$.

Figure 1:
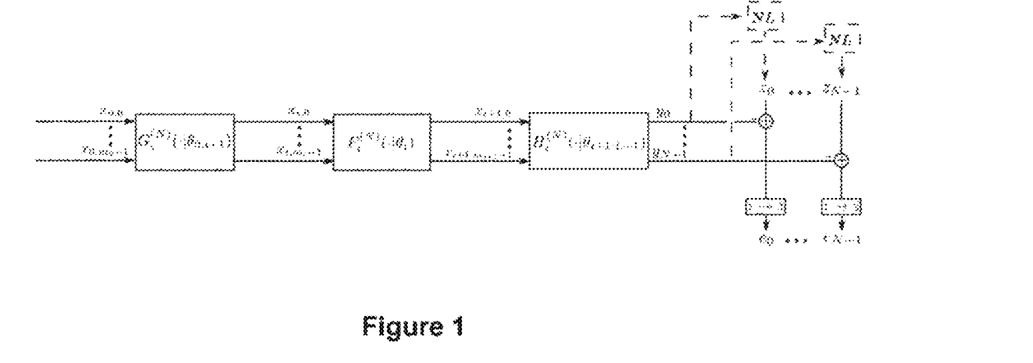
FIG. 1 schematically depicts the integration of a "specialized neuron" ($F_i$) in a set of upstream neurons ($G_i$) and in a set of downstream neurons ($H_i$) of a real-time method for the blind separation and demodulation of digital telecommunication signals according to one embodiment of the invention.

FIG. 1, for example, schematically depicts the integration of a "specialized neuron" $F_i$ in an upstream chain or set of neurons ($G_i$) and in a downstream chain or set of neurons ($H_i$) of a real-time method for the blind demodulation of digital telecommunication signals. The neuron $F_i$ is connected at the input to the last of the neurons of the set $G_i$, and at the output of the first of the set $H_i$.

In some embodiments, one of the processing blocks $F_i^{(N)}$ comprises at least one program implementing and executing a sequence of elementary processes of the form:

$F_i^{(N)}$ performs $(X_{i+1,0}, \ldots, X_{i+1,m_{i+1}-1})$=next $(X_{i,0}, \ldots, X_{i,m_i-1})$, $X_{ij} \in K^{q_{ij}}$ with $q_{ij}$ an integer and K the real number space or the complex number space $F_i^{(P)}$ performs $(e_{i,0}, \ldots, e_{i,m_i-1})$=propagate $(e_{i+1,0}, \ldots, e_{i+1,m_{i+1}-1})$ $F_i^{(U)}$ performs $\delta\theta_i$=update $(e_{i+1,0}, \ldots, e_{i+1,m_{i+1}-1})$ The processing performed by the block ($F_i^{(N)}$) depends on a parameter $\theta_i$ which can be a real or complex number, or a vector which is itself real or complex, etc.

In some embodiments, the function "next" implemented in the sub-neuron or sub-block $F_i^{(N)}$ is known analytically and depends on a parameter $\theta_i$.

It can be noted $(X_{i+1,0}, \ldots, X_{i+1,m_{i+1}-1}) = F_i^{(N)}(X_{i,0}, \ldots, X_{i,m_i-1}|\theta_i)$.

The elementary projections of the output vector on the component $X_{i+1,j}$ can be noted $F_{i,j}^{(N)}$.

In some embodiments, as depicted for example in FIG. 1, a network of specialized neurons (which can be arranged in a demodulator) for blind demodulation of a telecommunication signal with linear modulation comprises, in each of the neurons, a processing block ($G_i^{(N)}$, $F_i^{(N)}$, $H_i^{(N)}$). The first processing block ($G_i^{(N)}$) receives two signals each corresponding to a first plurality of observations of the signal in order to generate a plurality of outputs which are transmitted to the following logic block ($F_i^{(N)}$). The logic block ($F_i^{(N)}$) integrates the plurality of outputs to generate in turn another plurality of outputs which are transmitted to the last logic block ($H_i^{(N)}$) of the network. This last block ($H_i^{(N)}$) integrates in turn the plurality of outputs of the previous logic block ($F_i^{(N)}$) in order to also generate a plurality of outputs. A nonlinear filter is applied to the output of the last block ($H_i^{(N)}$), in order to calculate an error signal (e) to be able to retropropagate it with this calculated error over each of the inputs of the network associated with the respective input of the network.

In some embodiments, the set of L blocks can execute a processing chain of the following form, implemented and executed by at least one program:

for every $0 \leq i < L$ $(y, \ldots, y_{N-1}) = H_i^{(N)}(F_i^{(N)}(x_{i,0} \ldots x_{i,M_i-1} | \theta_0), \ldots,$ -continued $F_{i,N_i-1}^{(N)}(x_{i,0} \ldots x_{i,M_i-1} | \theta_{n_i-1}) | \theta_{i+1:L-1})$ with $(x_{i,0}, \ldots, x_{i,m_i-1}) = G_i^{\theta}(x_{0,0}, \ldots, x_{0,m_0-1} | \theta_{0:i-1})$
$= (G_{i,0}^{\theta}(x_{0,0}, \ldots, x_{0,m_0-1} | \theta_{0:i-1}), \ldots,$
$G_{i,m_1-1}^{\theta}(x_{0,0}, \ldots, x_{0,m_0-1} \theta_{0:i-1}))$ A number of L blocks are chained in succession to perform an overall processing.

The succession of blocks 0 to i−1 is noted $G_i^{(N)}(\ldots | \theta_{0:i-1})$ and the succession of blocks i+1 to L−1 is noted $H_i^{(N)}(\ldots | \theta_{i+1:L-1})$. The outputs of the last block are noted $y_0, \ldots, y_{N-1}$.

$F_{i,0}^{(N)}(x_{i,0} \ldots x_{i,m_i-1}|\theta_i), \ldots, F_{i,n_i-1}^{(N)}(x_{i,0} \ldots x_{i,m_i-1}|\theta_i)$ is used to note the $n_i$ projection functions giving $Y_{i,k} = F_{i,k}^{(N)}(x_{i,0} \ldots x_{i,m_i-1}|\theta_i)$ for $0 \leq k < n_i$.

In some embodiments, the variables on which each block output depends can be explained according to the following notation: $y_j = y_j^{\theta}(x_{0,0} \ldots x_{0,M_0-1})$. Each block output can be a real or complex value or even a vector value.

In some embodiments, the addition of the nonlinearity at the output of the last block ($H_i^{(N)}$) of the network is executed by a function implemented in a program which is written:

$z_j = NL(y_j)$ wherein $z_j$ is the outgoing signal from a decision-making device in the last block $y_j$ is a demodulated sample In some embodiments, the retropropagation of the calculated errors is obtained by the following processes, implemented and executed by an algorithm for retropropagation of the error:

initialization of the retropropagation in the form for $0 \leq k < N$, $e_{L,k} = \overline{z_k - y_k}$ propagation of the error by the sub-neuron $F_i^{(P)}$ in the function $(e_{i,0}, \ldots, e_{i,m_i-1})$=propagate $(e_{i+1,0}, \ldots, e_{i+1,m_{i+1}-1})$ according to the calculations $$\forall\, 0 \leq j < m_i,\; e_{i,j} = \sum_k e_{i+1,k} \cdot \frac{\partial F_{i,k}}{\partial x_{i,j}}$$

In some embodiments, the updating of the internal parameters $\theta_i$ of each neuron $F_i$ is obtained in the sub-neuron $F_i^{(U)}$ by the processes, implemented and executed in the function $\delta\theta_i$=update $(e_{i+1,0}, \ldots, e_{i+1,m_{i+1}-1})$ according to:

Calculation of $\Delta_i$:

$$\text{For } 0 \leq j < M_{i+1},\; D_{i,j} = e_{i+1,j} \cdot \frac{\partial F_{i,j}^{(N)}}{\partial \theta_i}$$

$$\Delta_i = \sum_j D_{i,j}$$

Updating of $\theta_i$:

$\theta_i += 2\mu \Re(\Delta_i)$ if $\theta_i$ is in an R vector space
$\theta_i += 2\mu \Delta_i$ if $\theta_i$ is in a C vector space With $\mu_i$ a real parameter called "learning rate"
$\delta\theta_i$ is the corrective parameter of the parameter $\theta_i$
$D_{ij}$ is an intermediate quantity of auxiliary calculations that can be temporarily stored.

In some embodiments, as the samples input into the system are processed by the different sub-blocks, the values of the different parameters $\theta_i$, which may be arbitrarily initialized, converge on values making the demodulation effective.

In some embodiments, the network of specialized neurons constitutes a sequence of MIMO blocks ("multi inputs, multi outputs"), each block (i) performing a parameterized elementary processing by a set $\theta_i$. If all the parameters $\theta_i$ of the chain are correctly set, the chain proceeds with the effective demodulation of the signal.

In some embodiments, the parameters $\theta_i$ are unknown, and the chain enables the in-line learning of the relevant values for each $\theta_i$. On initialization of the system, parameters $\theta_i$ are provided by default. In the first moments, the system enables the convergence of the parameters $\theta_i$ on relevant values; this phase is called the convergence phase; the demodulated signal produced at the output is thus not reliable. When the system reaches the vicinity of the parameters $\theta_i$, the process enters the "production" or "monitoring" phase. The outputs of the demodulator are then reliable and, together with the demodulation of the signal, the system continues with the variation of the parameters of the system. The system does not explicitly shift from one mode to the other; the second phase (or production phase) takes place as a continuation of the first.

In some embodiments, the method further comprises the storage, by at least one buffer memory, of the plurality of inputs and, in at least one other buffer, of the plurality of outputs of each specialized neuron of the network. The sample values extracted from the plurality of inputs of the signal can be transmitted into a first buffer, which may be associated with the corresponding processing block either temporarily or permanently depending on the desired application, so as to store the internal states of the input signal during an initiation phase. The values of the plurality of inputs can be stored in a second buffer which may be associated with a corresponding processing block either temporarily or permanently depending on the desired application, so as to store the internal states of the output signal.

In some embodiments, the memory buffers are of FIFO type ("first-in-first-out"), defining a method for organizing and manipulating a data buffer in which the first data input are processed first. Hereinafter, a FIFO memory buffer will be considered to be a vector. Thus, in some embodiments, the terms of the vector may go from the oldest (first index of the vector) to the most recent (last index of the vector) element of the FIFO buffer.

In some embodiments, the acquisition by a sampling is performed on two input signals.

In some embodiments, the method of the present invention is applied in a certain single-channel scheme on another device making it possible to demodulate a single-channel signal of linear modulation by compensating: the amplification of the signal, its phase, its carrier leak, the effects of the propagation channel.

In some embodiments, on initialization of the computing system constituting a demodulator, the parameters $\theta_i$ are provided by default by a memory of the system in the first moments of execution of the method, the system enabling the convergence of the parameters $\theta_i$ on relevant values.

In some embodiments, when the distances between the calculated values and those stored p and defining a vicinity are below a certain threshold pre-stored by the device, the outputs of the device are then delivered to a user apparatus.

In some embodiments, in the case of the blind demodulation of a digital telecommunication signal with linear modulation, two types of signals are identified:

"single-channel" signals: this is a conventional signal in which a stream of information is transmitted on a medium;

"multi-channel" signals or XPIC (cross-polarization interference canceler): these are several signals which are multiplexed over the two polarizations of the electromagnetic wave.

A representation of the single-channel signal in baseband may be of the form:

$$x_b(t) = \sum_{k=-\infty}^{+\infty} s_k h(t - kT)$$

With $(s_k)$ a sequence of complex numbers included in a finite sub-set referred to as constellation, h a shaping filter, T the symbol for time.

During its transmission, this signal undergoes different alterations and it may be received in the form:

$$x(t) = e^{2\pi1f0t}(Ae^{j\varphi}x_b(t-\delta t) + g * x_b(t)) + \eta(t)$$

With
$f_0$ the carrier frequency
A the amplitude of the main path
$\varphi$ the main phase
$\delta t$ the delay of the main path
g a filter which represents several phenomena: propagation channel caused by multiple paths, disruptive filter introduced by the imperfections in the electronic equipment
$\eta$ a complex noise In the case of the single-channel signal, the demodulation consists of finding the sequence $(s_k)$ from the observation of a sampled version of x(t).

A multi-channel signal representation, using two polarizations to transmit two signals, in baseband, can be of the form:

$$x_b^H(t) = \Sigma_{k=-\infty}^{+\infty} s_k^H h(t-kT) \text{ and}$$

$$x_b^V(t) = \Sigma_{k=-\infty}^{+\infty} s_k^V h(t-kT)$$

These signals are transmitted together on the polarizations H and V of the electromagnetic wave. The two signals are received in the form:

$$x^H(t) = e^{2\pi j f_0 L}(A^H e^{j\varphi^H} x_b^H(t-\delta t^H) + g_{HH} * x_b^H(t) + g_{VH} * x_b^V(t)) + \eta^H(t)$$

$$x^V(t) = e^{2\pi j f_0 L}(A^V e^{j\varphi^V} x_b^V(t-\delta t^V) + g_{VV} * x_b^V(t) + g_{HV} * x_b^H(t)) + \eta^V(t)$$

With
$f_0$ the carrier frequency
$A^H$, $A^V$ the amplitude of the main path on the channel H and on the channel V
$\varphi^H$, $\varphi^V$ the main phase on the channel H and on the channel V
$\delta t^H$, $\delta t^V$ the delay f the main path on the channel H and on the channel V
$g_{HH}$ a filter which represents the channel of the signal H on the reception channel H
$g_{VH}$ a filter which represents the channel of the signal V on the reception channel H $g_{VV}$ a filter which represents the channel of the signal V on the reception channel V $g_{HV}$ a filter which represents the channel of the signal H on the reception channel V $\eta^H$, $\eta^V$ complex noise on each reception channel.

In the case of the multi-channel signal, demodulation consists of finding the sequences ($s_k^H$) and ($s_k^V$) from the observation of a sampled version of the pair signal ($x^H(t)$, $x^V(t)$).

The equalization of the signal consists of reversing the transmission channels as best as possible. It is therefore sought to designate an equalization function. Such a function requires numerous parameters (frequency, amplitude, equalization filters, etc.). In a "non-blind" transmission mode, known sequences of the transmitter and the received are transmitted regularly and make it possible to regulate the equalizer. In a blind context, no sequence is known and the function is difficult to find.

In some embodiments, the present invention makes it possible to find the equalization function in the context of blind demodulation.

In some embodiments, the present invention can be applied equally in a blind context as well as in a non-blind one, but appears particularly beneficial in the former context. Indeed, this invention makes it possible to regulate a parameterizable processing chain without any prior knowledge. The invention is particularly relevant when several parameters are involved.

In some embodiments, a single-channel signal is defined as a linearly modulated digital signal transmitted by frequency transposition over a finite bandwidth. A dual-channel signal is defined as a pair of single-channel signals multiplexed over two orthogonal polarizations.

The method applied in a certain scheme makes it possible in particular to demodulate a single-channel signal of linear modulation by compensating: the amplification of the signal, its phase, its carrier leak, the effects of the propagation channel. The method applied according to another scheme to demodulate a dual-channel signal and to separate the two components thereof by compensating: the amplification of the signals, their phases, the carrier leaks, the effects of the propagation channel and the effects of the propagation co-channel (leak from one polarization to the other and vice-versa during the propagation of the signal).

Without losing the general nature and in order to simplify the explanations hereinbelow, it is possible for example to consider a single-channel signal to be a particular case of dual-channel signal.

Figure 3:
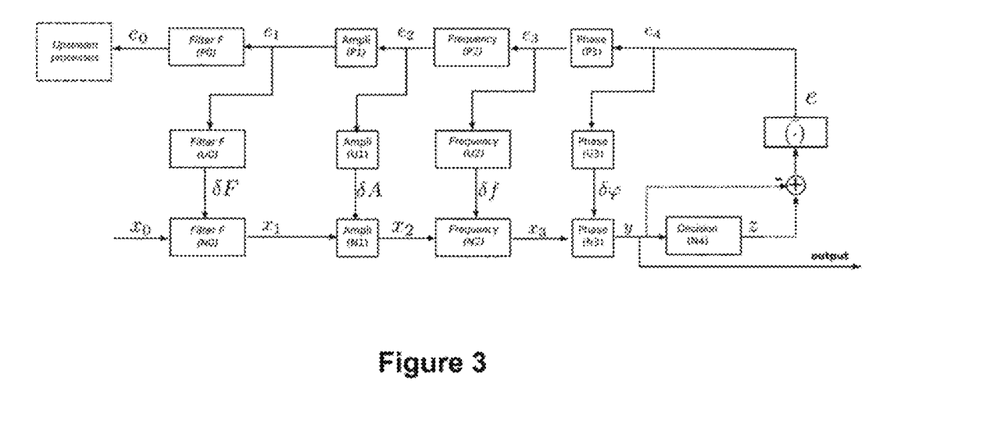
FIG. 3 schematically depicts a processing chain of a blind demodulator of single-channel type, according to one embodiment of the invention.
Figure 4:
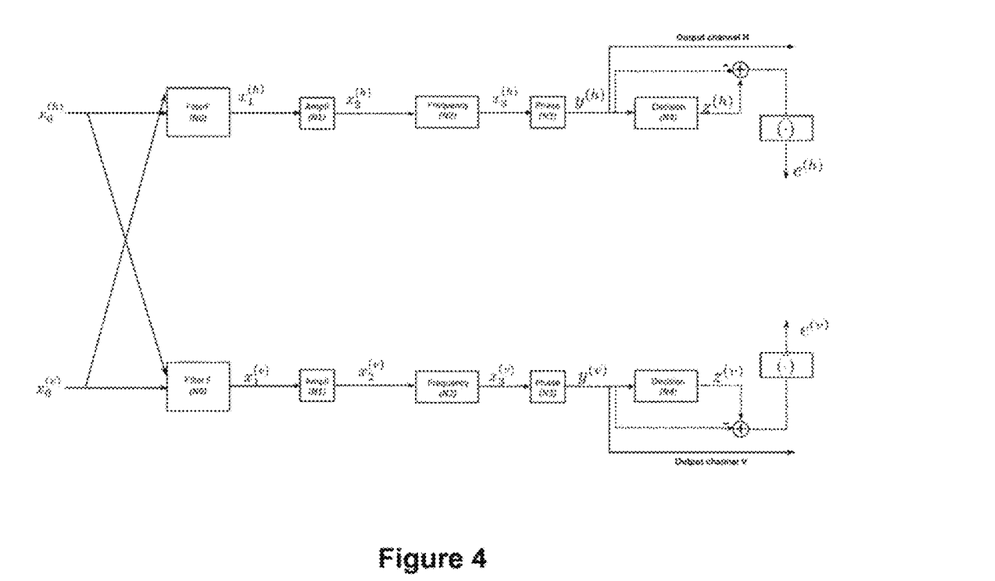
FIGS. 4 and 5 schematically depict a processing chain of a blind demodulator of multi-channel type, the generation and the transmission to the following block of a plurality of outputs from the preceding block and the retropropagation of the calculated errors, respectively.
Figure 5:
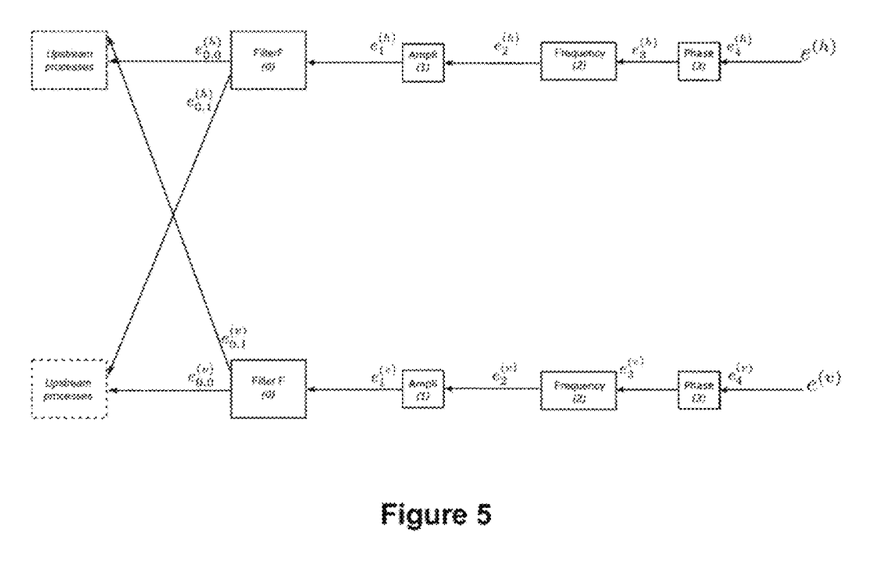

In some embodiments, for example as depicted in FIGS. 3 to 5, the calculation principles of the method of the present invention in order to determine the filter(s), the amplification, the frequencies of the signal and the phase values of the signal can be executed in a blind demodulator of a signal of single-channel type and/or of a signal of multi-channel type.

Thus, FIG. 3 depicts an example of an embodiment of a network of specialized neurons for the blind demodulation of a signal of single-channel type. FIG. 3 depicts the succession of processing blocks (N0 to N6), and then the retropropagation of the error (e) through the blocks (P5 to P0), which can each represent a characteristic of the signal. The errors enable the on-the-fly calculation in the blocks of the chain (U5 to U0) of the increments of the different parameters to be applied to the processing blocks. Each of the blocks U5 to U0 constituting "update" modules. The block P0 comprises an output that can be associated with an optional upstream chain, for example for synchronization. The filter F can make it possible to compensate the deformation of the signal due to propagation. The demodulator comprises several processing modules (Nx with x=0 to 4) each associated with an "Update" block (Ux with x=0 to 3) and a "Propagate" block (Px with x=0 to 3). The block (N0) produces filtering of the input signal (x) by storing the last values of said input signal in an internal buffer of FIFO type. Its output constitutes the input of the block (N1) correcting the amplification of the signal such that the power at its output constitutes the input of the block (N2) correcting the signal carrier drift. The output of (N2) constitutes the input of (N3) which corrects the signal phase. The processing module or block or logic sub-neuron (N3) is the last specialized neuron in the chain. Its complex output (y) applies the nonlinearity (N4) which is the decision function or slicer associated with the modulation of the signal. The output of the block (N4) is z. The error associated with the processed sample is $e_4=z-y$. It is injected in parallel into the "propagate" block (P3) and into the "update" block (U3). The block (P3) makes it possible to calculate the error $e_3$ and the block (U3) makes it possible to calculate the increment 59 to be applied to the current value of the phase in the module (N3). The error $e_3$ then passes through the blocks (P2) producing the error $e_2$ and the block (U2) which makes it possible to calculate the frequency increment $\delta\varphi$ to be applied to the current value of the frequency in (N2). The error $e_2$ then passes through the blocks (P1) producing the error $e_1$ and the block (U1) which makes it possible to calculate the amplitude increment $\delta A$ to be applied to the current value of the amplitude in the block (N1). Finally, the error $e_1$ then passes through the blocks (P0) producing the error $e_0$ and the block (U0) which makes it possible to apply the vector increment $\delta F$ to be applied to the current value of the filter in (N0). The value ($e_0$) is not used here but could be retropropagated in an upstream network performing specialized tasks such as, for example, the synchronization of the signal.

The succession of the processing blocks, the retropropagation of the error calculated through the "propagate" blocks and the increment of the different parameters of the blocks of the chain via the "update" blocks may be performed in a cascade and in a loop until the different parameters of the signal have been estimated as precisely as possible.

FIGS. 4 and 5 depict an example of an embodiment of a network of specialized neurons for the blind demodulation of a signal of multi-channel type, applied in a blind demodulator. FIG. 4 depicts the succession of the processing blocks from the reception of the two input samples $x_0^H$ and $x_0^V$;

FIG. 5 depicts the succession of the propagation and update blocks from the errors $e^H$ et $e^V$ calculated at the end of the processing chain. Thus, two blocks N0 each receive an input signal in order to generate the output signals $x_v$ and $x_h$.

In FIG. 4, $x_0^H$ and $x_0^V$ are two samples at the input of the system. The pair ($x_0^H$, $x_0^V$) constitutes the input of a first filtering block (N0) and the inverted pair ($x_0^V$, $x_0^H$) constitutes the input of another filtering block (N0). At the output of each of these blocks (N0), there is a single-channel processing chain duplicated apart from the filter. The two equalized outputs are $y^H$ and $y^V$ which constitute the two demodulated signals. The errors $e^H$ and $e^V$ are formed identically to the single-channel case.

In FIG. 5, the errors $e^H$ and $e^V$ initiate the retrogradation chain. The error is firstly propagated into two sub-chains identical to the retropropagation chain of the single-channel case. For better legibility, the blocks (x) represent all of the blocks (Px with x=0 to 3) and (Ux with x=0 to 3) which have the same inputs. The output of the block (x) is the output of the block (Px). At the end of the retropropagation chain, each filtering block produces two errors which can interface with an optional upstream chain such as, for example, a synchronization chain.

These different steps of this method are therefore performed continuously in an automatic manner, in order to be able to optimize and self-regulate the calculations or operations carried out by the neurons (via at least one suitable algorithm) of the processing chain. This method for blind separation and demodulation of a signal of the present invention has the advantage of rapidly estimating in real time the different characteristics of the signals transmitted and of setting up a suitable correction for each signal transmitted by retropropagating it in the generic signal-processing chain. Moreover, the method of the present invention has the advantage of simply and effectively dealing with the problems associated with communication interception and preferably for the blind demodulation of telecommunication signals.

The present invention also relates to a computer program product implemented on a memory medium, capable of being executed within a computing processing unit by computing hardware (such as a microprocessor and a memory); either by hardware or a combination of hardware and firmware, and comprising instructions for executing a method according to any one of the previous embodiments.

In some embodiments, the present invention proposes an architecture of a network of "specialized" neurons in order to deal with the problems of communication interception and more particularly of blind demodulation of telecommunication signals.

Indeed, an input signal passes through a chain of specialized neurons; each neuron performs a particular function parameterized by a set of values. The values of the adjustments of each specialized neuron are unknown beforehand. A nonlinearity is applied to the result at the chain end, making it possible to calculate an "error". It is then possible to retropropagate this error in the processing chain as is done in neural network learning in order to evolve the value of each parameter of each block towards a more relevant value.

The present invention further relates to a use in a system for the blind demodulation of a telecommunication signal. The system for blind demodulation or searching for the characteristics of the signal comprises at least one network of specific neurons.

In some embodiments, a first specialized neuron of the network comprises at least one filter enabling the blind acquisition of the signal and at least one amplification module making it possible to amplify the signals in order thereafter to evaluate the characteristics of the signals. In some embodiments, the amplification module can be arranged in a neuron other than the first neuron. A second specialized neuron comprises at least one frequency module for determining the frequencies of the blind-transmitted signals and/or at least one phase module for determining the phase values of said signals. In some embodiments, the phase module can be arranged in a neuron other than the second neuron. A third specialized neuron comprises a decision module for calculating an error signal and retropropagating the errors calculated at each of the remaining blocks of the previous neurons. The method according to any one of the previous embodiments is applied to determine the characteristics of the blind-transmitted signal (for example, the amplitude, the frequency, and the phase value of the signals).

In some embodiments, the method for blind demodulation can be applied in the case of the demodulation of a single-channel signal (as depicted for example in FIG. 3) and/or of a multi-channel signal (as depicted for example in FIGS. 4 and 5).

In some embodiments, for a signal of multi-channel type, aside from the demodulation of each channel, the method enables the blind separation of the different channels.

The present application describes various technical features and advantages with reference to the figures and/or various embodiments. A person skilled in the art will understand that the technical features of a given embodiment may in fact be combined with features of another embodiment unless the opposite is explicitly mentioned or it is not obvious that these features are incompatible or that the combination does not provide a solution to at least one of the technical problems mentioned in the present application.

In addition, the technical features described in a given embodiment may be isolated from the other features of this mode unless the opposite is explicitly stated.

It should be obvious for a person skilled in the art that the present invention allows embodiments in many other specific forms without departing from the scope of the invention as claimed. Therefore, the present embodiments should be considered to be provided for purposes of illustration, but may be modified within the range defined by the scope of the attached claims, and the invention should not be limited to the details provided above.

What is claimed is:

1. A real-time method for blind demodulation of digital telecommunication signals based on an observation of a sampled version of the digital telecommunication signals, the real-time method comprising:

acquisition of a first plurality of the digital telecommunication signals by sampling the first plurality of the digital telecommunication signals such that each digital telecommunication signal of the first plurality of the digital telecommunication signals constitutes an input of a network of processing blocks ($G_i$, $F_i$, $H_i$) that comprise specialized neurons, wherein each neuron of said specialized neurons is stimulated by outputs of a preceding block, wherein the first plurality of the digital telecommunication signals is input into a first block simulating a first neuron of the specialized neurons of the network in order to generate a plurality of outputs of the first block, wherein said each neuron of the specialized neurons is stimulated by outputs of an upstream chain $G_i$ of said processing blocks and stimulating a downstream chain $H_i$, of said processing blocks, wherein each set of samples passes through a same processing chain;

wherein outputs of last blocks of the network correspond to demodulated symbols;

addition of a nonlinearity to each of the outputs of the last blocks of the network to calculate an error signal and propagation of the error signal in a reverse direction of the same processing chain as retropropagation;

estimation, upon receipt of the error signal by said each neuron of the specialized neurons, of a corrective parameter $\delta\theta_i$ and updating, in each block of the processing blocks, of a value of a parameter $\theta_i$ according to $\theta_i+=\delta\theta$;

and that said each neuron of the network carries out processing of a next function, implemented and executed in a processing logic sub-block ($F_i^{(N)}$), in order to generate outputs based on a plurality of observations of the digital telecommunication signals and to transmit to the outputs to a processing block of the processing blocks of a neuron in the network; wherein said next function comprises $(X_{i+1,0}, \ldots, X_{i+1, m_{i+1}-1})$=next $(X_{i,0}, \ldots, X_{i,m_i-1})$ with $m_i$ comprising a number of inputs and $m_{i+1}$ comprising a number of outputs of $F_i^{(N)}$ which corresponds to a number of inputs of $F_{i+1}^{(N)}$;

processing of a propagate function, implemented and executed in a propagate logic sub-block ($F_i^{(P)}$) in order to calculate errors $(e_{i+1,0}, \ldots, e_{i+1,m_{i+1}-1})$ provided by a block $F_{i+1}^{(P)}$ or by $(e_{L-1,0}, \ldots, e_{L-1,N-1})=(e_0, \ldots, e_{N-1})$ with $e_j=z_j-y_j$ at an end of the same processing chain, comprising at an input $F_{L-1}^{(P)}$; wherein for an $i^{th}$ neuron, the propagate function comprises $(e_{i,0}, \ldots, e_{i,m_i+1})$=propagate $(e_{i+1,0}, \ldots, e_{i+1,m_{i+1}-1})$;

processing of an update function, implemented and executed in an update logic sub-block ($F_i^{(U)}$), in order to calculate corrective parameters $\delta\theta_i$ to be applied to a current value of the parameter $\theta_i$ from the errors $(e_{i+1,0}, \ldots, e_{i+1,m_{i+1}-1})$ returned by the block $F_{i+1}^{(P)}$; wherein said update function comprises $\delta\theta_i$=update $(e_{i+1,0}, \ldots, e_{i+1,m_{i+1}-1})$.

2. The real-time method according to claim 1, wherein said each neuron comprises at least one implementation and execution of a sequence of elementary processes comprising a sub-block
$F_i^{(N)}$ performs $(X_{i+1,0}, \ldots, X_{i+1, m_{i+1}-1})$=next $(X_{i,0}, \ldots, X_{i,m_i-1}), X_{ij} \in K^{q_{ij}}$,
with $q_1$, comprising an integer and K comprising a real number space or a complex number space;
a sub-block
$F_i^{(P)}$ performs $(e_{i,0}, \ldots, e_{i,m_i-1})$=propagate $(e_{i+1,0}, \ldots, e_{i+1,m_{i+1}-1})$;
a sub-block $F_i^{(U)}$ performs $\delta\theta_i$=update $(e_{i+1,0}, \ldots, e_{i+1,m_{i+1}-1})$.

3. The real-time method according to claim 1, wherein the addition of the nonlinearity at outputs of a last block ($H_i^{(N)}$) of the network is executed by a function comprising $z_j = NL(y_j)$, wherein $z_j$ is an outgoing signal from a decision-making device in the last block,
$y_j$ is an equalized or demodulated sample,
wherein the decision-making device in the last block is defined by a comparison of a result obtained by an output y of a phase block with a finite constellation of possible results stored by the decision-making device in the last block, and deciding to take, from possible results, one for which a distance with a representative point of the output y is smallest.

4. The real-time method according to claim 1, wherein the retropropagation of the error signal that is calculated is obtained by processes, implemented and executed by an algorithm for the retropropagation of the error signal, comprising initialization of the retropropagation comprising
for $0 \le k < N$, $e_{L,k} = z_k - y_k$,
propagation of the error signal by the sub-block $F_i^{(P)}$ in a function of $(e_{i,0}, \ldots, e_{i,m_i-1})$=propagate $(e_{i+1,0}, \ldots, e_{i+1,m_{i+1}-1})$ according to calculations comprising $$\forall\, 0 \le j < m_i,\; e_{i,j} = \sum_k e_{i+1,k} \cdot \frac{\partial F_{i,k}}{\partial x_{i,j}}.$$

5. The real-time method according to claim 4, wherein the updating of the value of the parameter $\theta_i$ of said each neuron is obtained in the sub-block $F_i^{(U)}$ by the processes, implemented and executed in a function of $\delta\theta_i$=update $(e_{i+1,0}, \ldots, e_{i+1,m_{i+1}-1})$ according to calculation of $\Delta_i$:

$$\text{for } 0 \le j < M_{i+1},\; D_{i,j} = e_{i+1,j} \cdot \frac{\partial F_{i,j}^{(N)}}{\partial \theta_i}$$

$$\Delta_i = \sum_j D_{i,j}$$

the updating of the parameter $\theta_i$:
$\theta_i \mathrel{+}= 2\mu \Re(\Delta_i)$ if $\theta_i$ is in an R vector space,
$\theta_i \mathrel{+}= 2\mu \Delta_i$ if $\theta_i$ is in a C vector space;
wherein $\mu_i$ is a real parameter called learning rate,
$\delta\theta_i$ is the corrective parameter of the parameter $\theta_i$,
$D_{ij}$ is an intermediate quantity of auxiliary calculations that are temporarily stored.

6. The real-time method according to claim 1, wherein as the samples that are input into a system are processed by different sub-blocks, arbitrarily initialized values of different parameters $\theta_i$ converge on values making the blind demodulation effective.

7. The real-time method according to claim 1, wherein the network of the specialized neurons constitutes a sequence of blocks of a multi inputs multi outputs (MIMO) type.

8. The real-time method according to claim 1, further comprising storage, by at least one buffer memory, of a plurality of inputs and, in at least one other buffer, of a plurality of outputs of said each neuron $F_i$ of the specialized neurons of the network.

9. The real-time method according to claim 1, wherein the acquisition by the sampling is performed on two input signals.

10. The real-time method according to claim 1, wherein the real-time method is applied in a certain single-channel scheme on another device to demodulate a single-channel signal of linear modulation by compensating an amplification of the digital telecommunication signals, a phase of the digital telecommunication signals, a carrier leak of the digital telecommunication signals, and effects of a propagation channel.

11. The real-time method according to claim 1, wherein, on initialization of a computing system constituting a demodulator, the parameter $\theta_i$ of said each neuron are provided by default by a memory of the computing system in first moments of execution of the real-time method, the computing system enabling convergence of the parameter $\theta_i$ of said each neuron on relevant values.

12. The real-time method according to claim 1, wherein, when distances between calculated values and values that are stored and defining a vicinity are below a certain threshold pre-stored by a device, outputs of the device are then delivered to a user apparatus.

13. A computer program product implemented on a non-transitory memory medium, executed within a computing processing unit, either by hardware or a combination of said hardware and firmware, and comprising instructions for executing a real-time method for blind demodulation of digital telecommunication signals based on an observation of a sampled version of the digital telecommunication signals, the real-time method comprising:

acquisition of a first plurality of the digital telecommunication signals by sampling of the first plurality of the digital telecommunication signals such that each digital communication signal of the first plurality of digital communication signals constitutes an input of a network of processing blocks ($G_i$, $F_i$, $H_i$) that comprise specialized neurons, wherein each neuron of said specialized neurons is stimulated by outputs of a preceding block, wherein the first plurality of the digital telecommunication signals is input into a first block simulating a first neuron of the specialized neurons of the network in order to generate a plurality of outputs of the first block, wherein said each neuron of the specialized neurons is stimulated by outputs of an upstream chain $G_i$ of said processing blocks and stimulating a downstream chain $H_i$ of said processing blocks, wherein each set of samples passes through a same processing chain;

wherein outputs of last blocks of the network correspond to demodulated symbols;

addition of a nonlinearity to each of the outputs of the last blocks of the network to calculate an error signal and propagation of the error signal in a reverse direction of the same processing chain as retropropagation;

estimation, upon receipt of the error signal by said each neuron of the specialized neurons, of a corrective parameter $\delta\theta_i$ and updating, in each block of the processing blocks, of a value of a parameter $\theta_i$ according to $\theta_i\mathrel{+}=\delta\theta$;

and that said each neuron of the network carries out processing of a next function, implemented and executed in a processing logic sub-block ($F_i^{(N)}$), in order to generate outputs based on a plurality of observations of the digital telecommunication signals and to transmit to the outputs to a processing block of the processing blocks of a neuron in the network; wherein said next function comprises $(X_{i+1,0}, \ldots, X_{i+1,m_{i+1}-1})=\text{next}(X_{i,0}, \ldots, X_{i,m_i-1})$ with $m_i$ comprising a number of inputs and $m_{i+1}$ comprising a number of outputs of $F_i^{(N)}$ which corresponds to a number of inputs of $F_{i+1}^{(N)}$;

processing of a propagate function, implemented and executed in a propagate logic sub-block ($F_i^{(P)}$) in order to calculate errors ($e_{i+1,0}, \ldots, e_{i+1,m_{i+1}-1}$) provided by a block $F_{i+1}^{(P)}$ or by ($e_{L-1,0}, \ldots, e_{L-1,N-1}$)=($e_0, \ldots, e_{N-1}$) with $e_j=\overline{z_j-y_j}$ at an end of the same processing chain, comprising at an input $F_{L-1}^{(P)}$; wherein for an $i^{th}$ neuron, the propagate function comprises ($e_{i,0}, \ldots, e_{i,m_i-1}$)=propagate ($e_{i+1,0}, \ldots, e_{i+1,m_{i+1}-1}$);

processing of an update function, implemented and executed in an update logic sub-block ($F_i^{(U)}$), in order to calculate corrective parameters $\delta\theta_i$ to be applied to a current value of the parameter $\theta_i$ from the errors ($e_{i+1,0}, \ldots, e_{i+1,m_{i+1}-1}$) returned by the block $F_{i+1}^{(P)}$; wherein said update function comprises $\delta\theta_i=\text{update}(e_{i+1,0}, \ldots, e_{i+1,m_{i+1}-1})$.

14. A use in a system for a blind demodulation of telecommunication signals, the system comprising at least one network of specialized neurons each respectively defining a filtering by a first specialized neuron of the specialized neurons, an amplification gain by a second specialized neuron of the specialized neurons, a frequency of the telecommunication signals by a third specialized neuron of the specialized neurons, and a phase value of the telecommunication signals by a fourth specialized neuron of the specialized neurons; wherein a real-time method is executed in order to determine characteristics of the telecommunication signals that are transmitted blindly, said real-time method comprising:

acquisition of a first plurality of the telecommunication signals by sampling the first plurality of the telecommunication signals such that each telecommunication signals of the first plurality of the telecommunication signals constitutes an input of the at least one network of specialized neurons, wherein each neuron of said specialized neurons is stimulated by outputs of a preceding block, wherein the first plurality of the telecommunication signals is input into a first block simulating the first specialized neuron of the specialized neurons of the at least one network in order to generate a plurality of outputs of the first block, wherein said each neuron of the specialized neurons is stimulated by outputs of an upstream chain $G_i$ of said at least one network and stimulating a downstream chain $H_i$ of said at least one network, wherein each set of samples passes through a same processing chain;

wherein outputs of last blocks of the at least one network correspond to demodulated symbols;

addition of a nonlinearity to each of the outputs of the last blocks of the at least one network to calculate an error signal and propagation of the error signal in a reverse direction of the same processing chain as retropropagation;

estimation, upon receipt of the error signal by said each neuron of the specialized neurons, of a corrective parameter $\delta\theta_i$ and updating, in each block of the at least one network, of a value of a parameter $\theta_i$ according to $\theta_i\mathrel{+}=\delta\theta$;

and that said each neuron of the at least one network carries out processing of a next function, implemented and executed in a processing logic sub-block ($F_i^{(N)}$), in order to generate outputs based on a plurality of observations of the telecommunication signals and to transmit to the outputs to a processing block of the at least one network of a neuron in the at least one network; wherein said next function comprises $(X_{i+1,0}, \ldots, X_{i+1,m_{i+1}-1})=\text{next}(X_{i,0}, \ldots, X_{i,m_i-1})$ with $m_i$ comprising a number of inputs and $m_{i+1}$ comprising a number of outputs of $F_i^{(N)}$ which corresponds to a number of inputs of $F_{i+1}^{(N)}$;

processing of a propagate function, implemented and executed in a propagate logic sub-block ($F_i^{(P)}$) in order to calculate errors ($e_{i+1,0}, \ldots, e_{i+1,m_{i+1}-1}$) provided by a block $F_{i+1}^{(P)}$ or by ($e_{L-1,0}, \ldots, e_{L-1,N-1}$)=($e_0, \ldots, e_{N-1}$) with $e_j=\overline{z_j-y_j}$ at an end of the same processing chain, comprising at an input $F_{L-1}^{(P)}$; wherein for an $i^{th}$ neuron, the propagate function comprises ($e_{i,0}, \ldots, e_{i,m_i-1}$)=propagate ($e_{i+1,0}, \ldots, e_{i+1,m_{i+1}-1}$);

processing of an update function, implemented and executed in an update logic sub-block ($F_i^{(U)}$), in order to calculate corrective parameters $\delta\theta_i$ to be applied to a current value of the parameter $\theta_i$ from the errors ($e_{i+1,0}, \ldots, e_{i+1,m_{i+1}-1}$) returned by the block $F_{i+1}^{(P)}$; wherein said update function comprises $\delta\theta_i=\text{update}(e_{i+1,0}, \ldots, e_{i+1,m_{i+1}-1})$.

\* \* \* \* \*